(12) United States Patent
Phadke

(10) Patent No.: US 11,271,468 B2
(45) Date of Patent: Mar. 8, 2022

(54) HIGH PERFORMANCE SYNCHRONOUS RECTIFICATION IN DISCONTINUOUS CURRENT MODE CONVERTERS

(71) Applicant: Apple Inc., Cupertino, CA (US)

(72) Inventor: Vijay Phadke, San Jose, CA (US)

(73) Assignee: Apple Inc., Cupertino, CA (US)

( * ) Notice: Subject to any disclaimer, the term of this patent is extended or adjusted under 35 U.S.C. 154(b) by 316 days.

(21) Appl. No.: 16/209,633

(22) Filed: Dec. 4, 2018

(65) Prior Publication Data

US 2020/0076291 A1  Mar. 5, 2020

Related U.S. Application Data

(60) Provisional application No. 62/725,113, filed on Aug. 30, 2018.

(51) Int. Cl.
*H02M 3/335* (2006.01)
*H02M 3/158* (2006.01)
*H02M 1/08* (2006.01)

(52) U.S. Cl.
CPC .......... *H02M 1/08* (2013.01); *H02M 3/1588* (2013.01); *H02M 3/33592* (2013.01)

(58) Field of Classification Search
CPC ............. H02M 3/33592; H02M 3/335; H02M 3/33576; H02M 3/33569; H02M 3/33507; H02M 1/08; H02M 3/1588
See application file for complete search history.

(56) References Cited

U.S. PATENT DOCUMENTS

| | | | | |
|---|---|---|---|---|
| 7,830,130 B2* | 11/2010 | Jacques | ............. | H02M 3/33538 323/282 |
| 8,040,698 B2* | 10/2011 | Hyuugaji | .......... | H02M 3/33592 363/21.14 |
| 8,064,229 B2* | 11/2011 | Stuler | ................ | H02M 3/33592 363/21.06 |
| 8,072,787 B2* | 12/2011 | Yang | .................. | H02M 3/33592 363/127 |
| 10,044,265 B1* | 8/2018 | Ozawa | ................... | H03F 1/0216 |
| 10,063,154 B2* | 8/2018 | Ptacek | .................... | H02M 1/08 |
| 2006/0120123 A1* | 6/2006 | Phadke | ............. | H02M 3/33592 363/125 |
| 2009/0016083 A1* | 1/2009 | Soldano | ............ | H02M 3/33592 363/20 |
| 2010/0124086 A1* | 5/2010 | Chen | ................. | H02M 3/33592 363/127 |

(Continued)

*Primary Examiner* — Gustavo A Rosario-Benitez
(74) *Attorney, Agent, or Firm* — Fletcher Yoder PC

(57) ABSTRACT

Disclosed herein are synchronous rectifier control techniques for Discontinuous Current Mode (DCM) converters. These techniques may be particularly advantageous where the current shape is triangular in nature with a fixed downslope. Such converters may include DCM flyback converters and DCM buck converters. The proposed control techniques can reduce body diode conduction of the synchronous rectifier and optimize turn-off timing, while negating the effect of parasitic circuit elements. These techniques may also help simplify the control of synchronous rectifiers operated in parallel mode. Finally, such techniques may also help achieve higher performance in variable output voltage converters and converters that operate at high switching frequencies.

23 Claims, 9 Drawing Sheets

(56) References Cited

U.S. PATENT DOCUMENTS

| | | | |
|---|---|---|---|
| 2011/0090725 A1* | 4/2011 | Lu | H02M 3/1588 |
| | | | 363/127 |
| 2012/0127762 A1* | 5/2012 | Reddy | H02M 3/33592 |
| | | | 363/21.04 |
| 2016/0049876 A1* | 2/2016 | Lee | H02M 3/33592 |
| | | | 363/20 |
| 2016/0276931 A1* | 9/2016 | Trichy | H02M 3/158 |
| 2017/0222568 A1* | 8/2017 | Choi | H02M 3/33592 |
| 2018/0091046 A1* | 3/2018 | Krueger | H02M 1/08 |
| 2019/0165685 A1* | 5/2019 | Lind | H02M 3/33523 |

\* cited by examiner

HIGH PERFORMANCE SYNCHRONOUS RECTIFICATION IN DISCONTINUOUS CURRENT MODE CONVERTERS

BACKGROUND

Many power conversion applications employ discontinuous current mode (DCM) switching power converters, such as flyback converters or buck converters. Advantages of such converters can include lower common mode noise and reduced turn-on losses. Such converters use a "control switch" element and a "rectifier" element. The control switch operates to achieve voltage or current regulation, responsive to the load, while the rectifier converts an alternating current to a direct current. An exemplary flyback converter 100 is illustrated in FIG. 1A, and an exemplary buck converter 150 is illustrated in FIG. 1B. Both converters use a diode as the rectifier element. In flyback converter 100 of FIG. 1A, the rectifier is diode D2. In buck converter 150 of FIG. 1B, the rectifier is diode D1.

Typical rectifier diodes may have high conduction losses, as the forward voltage drop may range between 0.5V to 1.2V. Thus, in some embodiments, it may be preferred to use a synchronous rectifier in place of the diode. A synchronous rectifier employs a low on resistance MOSFET as rectifier. A suitable synchronous rectifier control circuit (SR controller) operates the MOSFET to emulate the behavior of a diode, but with very low forward voltage drop. Essentially, the MOSFET may be kept turned off during blocking period. As a result, the parasitic body diode of the MOSFET blocks the reverse voltage. The MOSFET may be kept turned on during the forward conduction period. As a result, the low on resistance shunts the body diode to allow for very low conduction losses. The SR controller includes all the necessary logic and sensing to achieve such operation. Disclosed herein are various discontinuous current mode flyback and buck converters with improved synchronous rectifier circuits.

SUMMARY

A synchronous rectifier controller can include a voltage sensing terminal configured to receive a voltage across a synchronous rectifier switch and one or more parasitic inductances, an off threshold terminal configured to receive a turn off voltage offset determined as a function the one or more parasitic inductances, a drive terminal configured to provide a drive signal to a synchronous rectifier device, and control logic. The control logic can be configured to compare the sensed voltage to a turn on threshold and to turn on the synchronous rectifier device when the sensed voltage exceeds the turn on threshold and compare the sensed voltage to the turn off voltage offset determined as a function of the one or more parasitic inductances and turn off the synchronous rectifier device when the sensed voltage falls below the turn off threshold. The control logic may further include a minimum on time timer circuit and/or a minimum off time timer circuit. The minimum on time timer circuit may be configured to provide different minimum on times for different output voltages, with minimum on time being inversely proportional to the output voltage. Additionally, the controller may detect a light load condition and enter a light load operating mode responsive to a rectifier on time that is less than a predetermined multiple of the minimum on time. The controller may further exit a light load operating mode responsive to a rectifier on time that is greater than a predetermined multiple of the minimum on time. In addition to the minimum off time timer circuit, the synchronous rectifier controller may incorporate a differentiator based sensing circuit configured to selectively enable and disable synchronous rectifier drive responsive to ringing sensed across the synchronous rectifier.

A discontinuous current mode power converter can include an input configured to receive an input voltage, an output configured to deliver a regulated output voltage to a load, a main switching device configured to alternately couple the input voltage to an inductive element and decouple the input voltage from the inductive element, wherein the main switching device is operated to maintain the regulated output voltage at the output, and a synchronous rectifier switching device coupled to the output. The synchronous rectifier switching device may be configured to be switched on when a voltage across the synchronous rectifier device and one or more parasitic inductances associated therewith exceeds a first threshold. The synchronous rectifier switching device may be further configured to be switched off when the voltage across the synchronous rectifier device and the one or more parasitic inductances associated therewith falls below a second threshold determined as a function of the one or more parasitic inductances associated with the synchronous rectifier device.

The power converter may be a buck converter, with the inductive element being a buck inductor. Alternatively, the power converter may be a flyback converter, with the inductive element being a flyback transformer. The one or more parasitic inductances associated with the synchronous rectifier device can include one or more parasitic inductances associated with a package of the synchronous rectifier device and/or one or more parasitic inductances associated with a printed circuit board trace coupling the inductive element to the synchronous rectifier device. The synchronous rectifier switching device can include two or more synchronous rectifier switching devices coupled in parallel. The second threshold may be produced by a voltage divider coupled across the output. The voltage divider can include first and second resistors having a resistance ratio the same as a ratio of the one or more parasitic inductances to the inductance of the inductive element.

A discontinuous current mode power converter can also include an input configured to receive an input voltage, an output configured to deliver a regulated output voltage to a load, a main switching device configured to alternately couple the input voltage to an inductive element and decouple the input voltage from the inductive element, wherein the main switching device is operated to maintain the regulated output voltage at the output, a synchronous rectifier switching device coupled to the output, and a synchronous rectifier controller. The synchronous rectifier controller may further include a voltage sensing terminal configured to receive a voltage across a synchronous rectifier switch and one or more parasitic inductances, an off threshold terminal configured to receive a turn off voltage offset determined as a function the one or more parasitic inductances, a drive terminal configured to provide a drive signal to a synchronous rectifier device, and control logic. The control logic may be configured to compare the sensed voltage to a turn on threshold and to turn on the synchronous rectifier device when the sensed voltage exceeds the turn on threshold and/or to compare the sensed voltage to the turn off voltage offset determined as a function of the one or more parasitic inductances and turn off the synchronous rectifier device when the sensed voltage falls below the turn off threshold.

The control logic configured to compare the sensed voltage to a turn on threshold and to turn on the synchronous rectifier device when the sensed voltage exceeds the turn on threshold can include a minimum on time timer circuit and/or a minimum off time timer circuit. The minimum on time timer circuit may be configured to provide different minimum on times for different output voltages, with minimum on time being inversely proportional to the output voltage. Additionally, the controller may detect a light load condition and enter a light load operating mode responsive to a rectifier on time that is less than a predetermined multiple of the minimum on time. The controller may further exit a light load operating mode responsive to a rectifier on time that is greater than a predetermined multiple of the minimum on time. In addition to the minimum off time timer circuit, the synchronous rectifier controller may incorporate a differentiator based sensing circuit configured to selectively enable and disable synchronous rectifier drive responsive to ringing sensed across the synchronous rectifier.

The power converter may be a buck converter, and the inductive element may be a buck inductor. Alternatively, the power converter may be a flyback converter, and the inductive element comprises a flyback transformer. The one or more parasitic inductances associated with the synchronous rectifier device may include one or more parasitic inductances associated with a package of the synchronous rectifier device and/or one or more parasitic inductances associated with a printed circuit board trace coupling the inductive element to the synchronous rectifier device. The synchronous rectifier switching device may include two or more synchronous rectifier switching devices coupled in parallel. The second threshold determined as a function of the one or more parasitic inductances associated with the synchronous rectifier device may be produced by a voltage divider coupled across the output. The voltage divider may include first and second resistors having a resistance ratio the same as a ratio of the one or more parasitic inductances to the inductance of the inductive element.

A method of operating a synchronous rectifier of a discontinuous current mode power converter can include sensing a voltage across a synchronous rectifier device and one or more parasitic inductances associated with the synchronous rectifier device, comparing the sensed voltage to a turn off voltage offset derived from the inductance of the one or more parasitic inductances, and turning off the synchronous rectifier device when the sensed voltage falls below the turn off voltage offset. The power converter may be a buck converter or a flyback converter. The one or more parasitic inductances associated with the synchronous rectifier device can include one or more parasitic inductances associated with a package of the synchronous rectifier device and/or one or more parasitic inductances associated with a printed circuit board trace coupling the inductive element to the synchronous rectifier device.

DETAILED DESCRIPTION

Figure 1A:
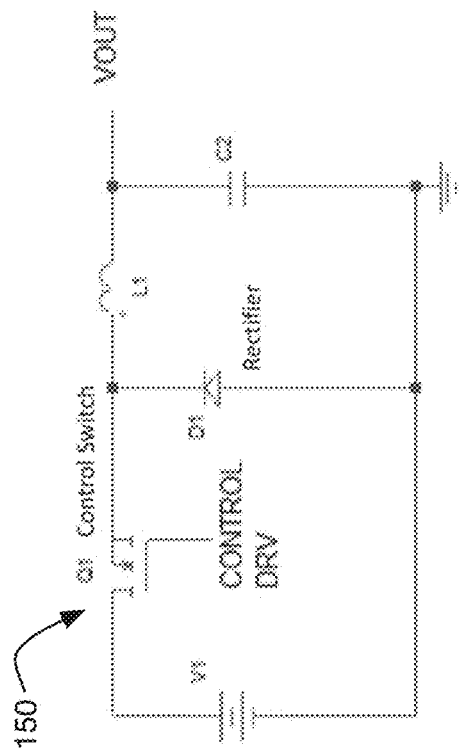
FIG. 1A illustrates a flyback converter with diode rectification.
Figure 1B:
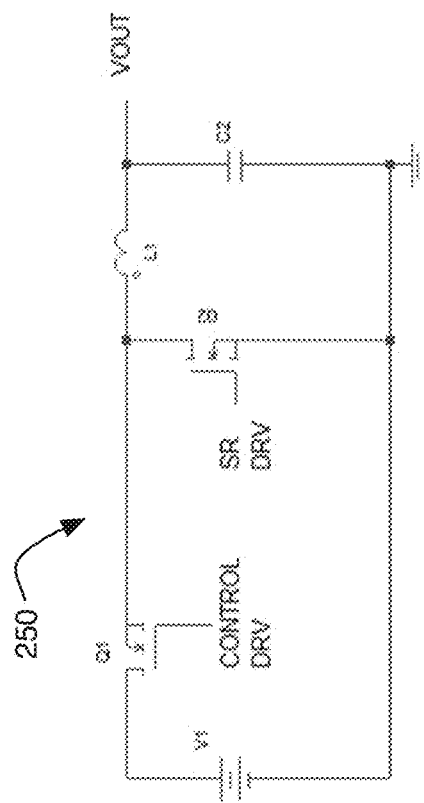
FIG. 1B illustrates a buck converter with diode rectification.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

Figure 2A:
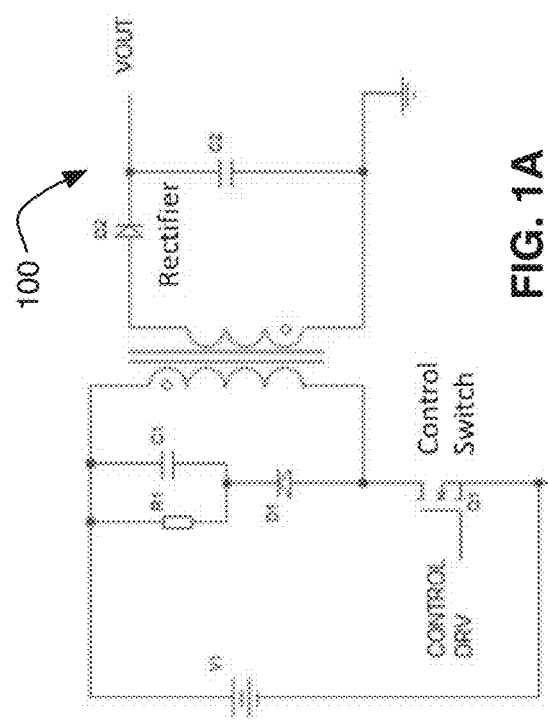
FIG. 2A illustrates a flyback converter with synchronous rectification.
Figure 2B:
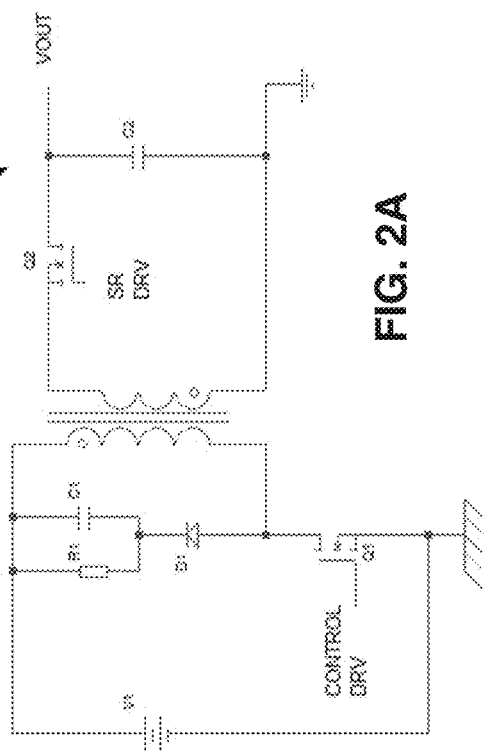
FIG. 2B illustrates a flyback converter with synchronous rectification.

Described below with reference to FIGS. 2A and 2B are a flyback converter 200 and a buck converter 250 with a synchronous rectification arrangement. For converters that operate in discontinuous conduction mode (DCM), self-driven synchronous rectifiers Q2 may be preferred. In such control, a comparator (not shown) monitors the voltage drop across the synchronous rectifier MOSFET device Q2 such that the synchronous rectifier switch Q2 is turned on only when current is flowing from its source to drain. Whenever, the current direction is about to reverse or the current falls to zero, the synchronous rectifier MOSFET Q2 is turned off. Essentially, when the current in the channel of synchronous rectifier MOSFET Q2 falls to zero, the voltage drop corresponding to the on resistance of Q2 also falls to zero. This zero voltage threshold at zero current may be set as the turn off threshold for the synchronous rectifier. However, this control technique may suffer from some practical limitations because of parasitic elements of the synchronous rectifier device and circuit layout. These parasitic elements and their effect on operation of the synchronous rectifier are explained in greater detail below.

Figure 3:
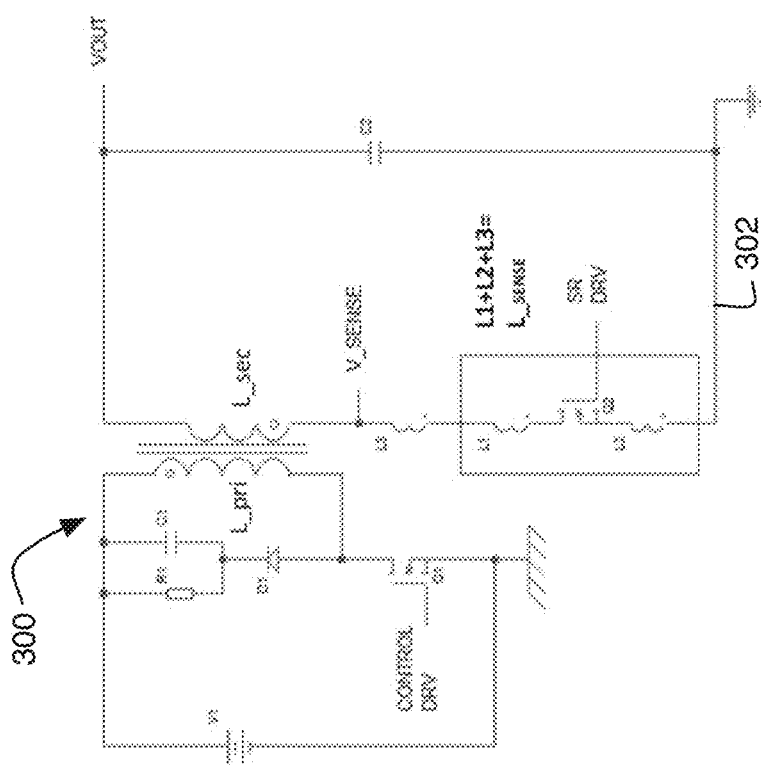
FIG. 3 illustrates a flyback converter with synchronous rectification and further illustrates certain parasitic elements of the circuit.

In the foregoing description referencing FIG. 3, a discontinuous current mode (DCM) flyback converter 300 is used as an example to elaborate the operation. However, the same principles and explanation apply to the freewheeling rectifier of a discontinuous current mode (DCM) buck converter. As illustrated in FIG. 3, the synchronous rectifier device Q2 may be disposed in the negative line 302 of the output rail. This can simplify the control of synchronous rectifier device Q2 with respect to the circuit's common ground. Additionally, this positioning of the synchronous rectifier can also allow using the converter's output voltage VOUT as the bias supply for synchronous rectifier device Q2. FIG. 3 shows the pertinent circuit elements of a DCM flyback converter along with the pertinent parasitic elements.

In flyback converter 300, Q1 is the control switch. Control switch Q1 is operated to achieve output voltage regulation (i.e., to produce a desired regulated output voltage VOUT). Coupled inductor TX1, sometimes called a flyback transformer, has a primary winding with inductance L_pri and a secondary winding having inductance L_sec. Resistor R1, capacitor C1, and diode D1 form a primary side clamp circuit that may be used to limit the voltage caused by the turn off of Q1 and also to recover energy from the leakage inductance of the flyback transformer. A variety of clamp designs are known in the art and may be used in the flyback converter.

On secondary side, MOSFET Q2 is the used as synchronous rectifier. Inductors L1 and L2 are the drain and source parasitic inductances, respectively, of the MOSFET package. These parasitic inductances are primarily caused by the wire bonds and lead frame design of the device. Inductor L3 is a lumped-up representation of external printed circuit board (PCB) layout parasitic inductance. This parasitic inductance L3 in series with Q2 connects to the node "V_SENSE," which is where the synchronous rectifier controller (not shown) monitors the voltage drop across Q2 (and the associated parasitic inductances enumerated above). When control switch Q1 is on, current ramps up in primary L_pri and stores energy in the inductor. When Q1 turns off, at an instance determined by regulation circuit, the inductor current transfers to the secondary side L_sec, and the stored energy is delivered to the output through synchronous rectifier Q2. Initially, the intrinsic body diode of synchronous rectifier switch Q2 conducts, and a large voltage drop of about −0.7V is sensed at the V_SENSE node (with respect to source node of synchronous rectifier switch Q2). This voltage triggers turn on of synchronous rectifier switch Q2 by the synchronous rectifier controller (not shown). Ideally, synchronous rectifier switch Q2 should turn on as soon as its intrinsic body diode starts to conduct, and before the current through synchronous rectifier switch Q2 reaches its maximum value. This reduces conduction losses associated with the intrinsic body diode. In some embodiments, a Schottky diode (not shown) may be placed in parallel with synchronous rectifier switch Q2 to reduce the conduction losses associated with the body diode at the leading edge (i.e., before synchronous rectifier switch Q2 turns on). In any event, to achieve sufficiently rapid turn-on of synchronous rectifier switch Q2, some synchronous rectifier controllers may be configured to turn on synchronous rectifier switch Q2 in response to a sensed voltage level in the range of 0.2V~0.3V.

Figure 4A:
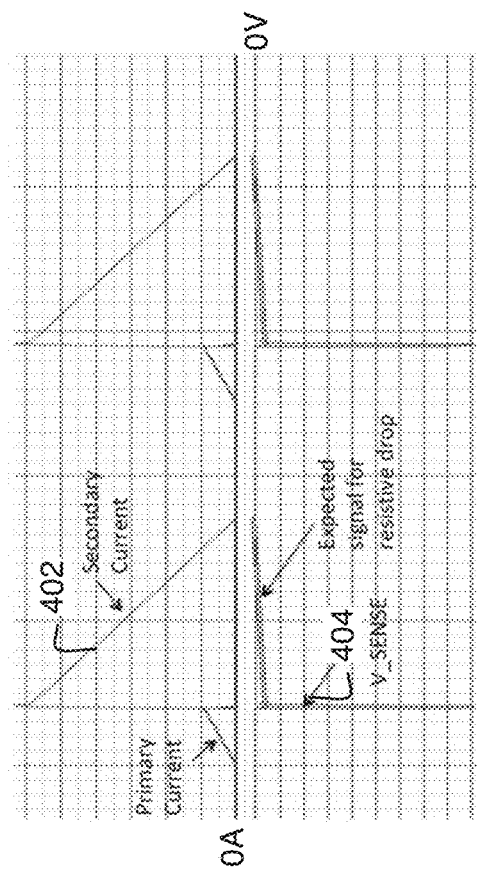
FIG. 4A illustrates certain current and voltage waveforms associated with the flyback converter of FIG. 3.
Figure 4B:
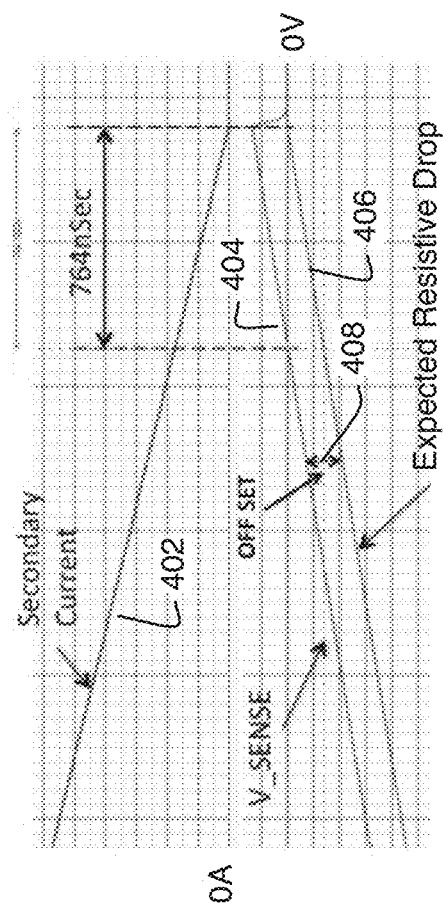
FIG. 4B further illustrates an enlarged view of certain current and voltage waveforms associated with the flyback converter of FIG. 3.

As can be seen with reference to FIGS. 4A and 4B, once secondary current 402 reaches peak value, it starts to ramp down as the inductor discharges. This current has a fixed, linear down-slope, and also flows through secondary winding L_sec and synchronous rectifier switch Q2. In an idealized circuit, the synchronous rectifier controller would sense the corresponding voltage drop in the channel resistance of synchronous rectifier switch Q2. Thus, when the secondary current 402 reached zero, the voltage drop across synchronous rectifier switch Q2 would also be zero. However, in a real implementation, the fixed dI/dT of discharging secondary current 402 (i.e., constant rate of change of the secondary current) generates a back EMF in the parasitic inductances L1, L2 and L3. This can be seen in FIGS. 4A and 4B, in which the voltage at V_SENSE node 404 can be clearly seen to reach zero well before the secondary current 402 reaches zero (and before the expected resistive voltage drop 406 reaches zero). The illustrated waveforms were generated from a simulation using a 12V output converter operating at 200 kHz, having primary inductance of 125 uH, secondary inductance of 2.81 uH, turns ratio of 6.667:1, employing a 4 mOhm on resistance MOSFET device for Q2, having a 3 nH combined parasitic leakage inductance (L_SENSE=L1+L2+L3), which includes the device package and PCB layout parasitic inductances.

FIG. 4B depicts a magnified look at the V_SENSE signal 404. As can be seen, V_SENSE signal 404 crosses zero volts 764 ns before the actual zero current instance. The reason for the error in sensed voltage is due to voltage induced in the parasitic inductance "L_SENSE," which is the series combination of parasitic inductances L1, L2 and L3 in the sensing path. As a result, a fixed offset voltage 408 is induced in L_SENSE due to the dI/dT (rate of current change) in the parasitic inductances. Triggering switching of synchronous rectifier device off the zero crossing of V_SENSE voltage 404 causes a false trigger that results in the synchronous rectifier controller prematurely turning off synchronous rectifier switch Q2. This premature switching can have a negative impact on the efficiency of the circuit (because the secondary current ends up flowing through the relatively higher resistance of the intrinsic body diode, resulting in a voltage drop of ~0.7V rather than the relatively lower resistance of the turned-on MOSFET, resulting in a lower voltage drop. If synchronous rectifier switch Q2 has a relatively higher resistance, and the voltage induced in the parasitic inductance L_SENSE is much smaller than the voltage drop in MOSFET channel, then the resultant error may not be significant, and the resulting adverse efficiency impact may be small. However, to gain maximum advantage from the synchronous rectifier arrangement, it is often preferred to use a synchronous rectifier switch Q2 having a very low on resistance. As a result, the voltage induced in the parasitic inductance L_SENSE may not be much smaller than the voltage drop in the MOSFET channel, and the resultant error may become significant. This larger error may result in a larger adverse efficiency impact. These issues may become more severe at higher switching frequencies as L_SENSE remains the same, but dI/dT (the rate of current change through L_SENSE) becomes much higher. This can cause higher offset error voltage and even more premature turn off of Q2, making the associated adverse efficiency impact even worse.

Furthermore, in some embodiments, for example cost sensitive applications, primary side regulation may be used to regulate the output voltage VOUT of the flyback converter. In such cases, the reflection of output voltage VOUT is sensed on the primary side at the instance of transformer demagnetization and used to control main switch Q1. If the body diode conduction of synchronous rectifier switch Q2 near the zero current crossing is significant, then the sudden change of voltage across the rectifier from near zero (with synchronous rectifier switch Q2 on) to 0.7V (with synchronous rectifier switch Q2 off) can cause large error in primary side sensing. This can significantly degrade the output voltage regulation. In some embodiments, it may also be desirable that synchronous rectifier switch Q2 does not remain on after the secondary current 402 reaches zero. That would allow the secondary current to reverse, which would result in energy from the output being returned to the input, causing lower efficiency and higher voltage stresses in synchronous rectifier switch Q2. Nonetheless, there are some commercially available synchronous rectifier controllers that use a threshold of "zero" volts for turning off synchronous rectifier switch Q2. These commercially available controller can end up allowing significant body diode conduction, particularly when operated at higher frequency. In fact, some such controllers allow setting a turn off threshold lower than zero volts.

It should be further noted that even if a small amount of body diode conduction from premature turn off of synchronous rectifier switch Q2 were accepted, there are new standards that cause further difficulties. For example, external AC/DC adapters may be designed in compliance with USB-C standards in which the output voltage can change from 5V to 20V (or various intermediate values). Although secondary winding inductance L_sec is a fixed element, large output voltage changes can significantly affect the rate of fall of the secondary current (dI/dT). The dI/dT (rate of current change) will be lowest/smallest at a 5V output voltage and will become four times higher at 20V. Thus, if the synchronous rectifier controller were to be optimized for 20V operation, the body diode conduction at 5V will be much higher, negatively impacting the efficiency of the converter. Alternatively, if the operation is optimized for 5V, then 20V operation will result in large reverse current.

Some commercially available synchronous rectifier controllers attempt to regulate the body diode conduction of synchronous rectifier switch Q2 to a fixed duration, such as 300 ns. This methodology not only degrades the efficiency but also adds control complexity. More specifically, a digital control mechanism is required to measure and provide closed loop control of the body diode conduction time t. Some other commercially available synchronous rectifier controllers use an external discrete compensation inductance to balance the undesired parasitic inductance in the sensing path. This approach adds significant cost and complexity to the synchronous rectifier controller and also puts restrictions on the design of the converter, all leading to higher cost.

The synchronous rectifier controller embodiments and techniques described below address these challenges to deliver a simpler, less expensive synchronous rectifier controller that can substantially reduce, and, in some embodiments, virtually eliminate body diode conduction of the synchronous rectifier switch Q2 at the lagging end of the secondary current. Further, the control scheme described herein may automatically compensate for large output voltage changes, such as might occur with USB-C AC/DC adapters.

Turning back to FIG. 3, when secondary winding L_sec delivers energy to the load, synchronous rectifier switch Q2 is turned on. Neglecting the ripple voltage across the output, it can be said that VOUT is impressed across the series combination of L_sec, L_SENSE, and the on resistance of synchronous rectifier switch Q2. as a result, the resistive voltage drop across the channel of synchronous rectifier switch Q2 is the on resistance of synchronous rectifier switch Q2 times the instantaneous secondary current. Similarly, the voltage drop across secondary inductance is L_sec times the rate of change of the secondary current, dIsec/dT and the voltage drop across the parasitic inductance L_SENSE is L_SENSE×dIsec/dT. Because the same current is flowing in L_sec and L_SENSE, they may be thought of as a voltage divider. Thus, the voltage drop across the voltage divider made up of L_sec and L_SENSE is VOUT minus V_Q2, where V_Q2 is the resistive voltage drop across the channel of synchronous rectifier Q2.

The resistive voltage drop across the channel of synchronous rectifier Q2, V_Q2, decreases as the secondary current Tout falls from its peak value towards the zero. However, the voltage drop across L_SENSE is caused by the rate of change of the output current Tout, a fixed value dIout/dT. Thus, the voltage drop across L_SENSE remains constant until the output current reaches zero. As a result, when the synchronous rectifier current value is very close to zero, the voltage drop in the synchronous rectifier MOSFET channel (i.e., V_Q2) is nearly zero and can be neglected for all practical purposes. At this instance, the entire output voltage VOUT is dropped across the series combination of L_sec and L_SENSE. This particular instant may be used to predict the offset voltage (408, FIG. 4B) generated across L_SENSE, which causes premature turn off of synchronous rectifier switch Q2.

Many modern DCM flyback converters employ surface mount MOSFETS for synchronous rectification, which can allow for a higher level of assembly automation while saving space and cost. For any given device, because of device structure and repeatability in the packaging, particularly an SMD package, the drain and source parasitic inductances (L1, L2) of the MOSFET are substantially fixed and highly consistent. Similarly, once PCB layout is finalized, the parasitic layout inductance L3 is also highly repeatable due to consistencies in the PCB fabrication process. As a result, in a "finished design" (i.e., one in which the synchronous rectifier device and package have been selected and the PCB layout finalized), the value of L_SENSE is substantially fixed (and may be known with a relatively high degree of accuracy and consistency). Similarly, for a given design, the value of secondary inductance L_sec is also fixed by design, barring a small manufacturing tolerance.

As a result, the offset voltage induced in parasitic inductances L_SENSE is:

$$V_{offset} = \frac{V_{OUT}}{L_{sec} + L_{SENSE}} \cdot L_{SENSE}$$

In the exemplary case discussed above:

$$V_{offset} = \frac{12V}{2810nH + 3nH} \cdot 3\ nH = 0.0128V$$

Thus, an offset error voltage of 12.8 mV will be induced in the sense inductance L_SENSE. Most practical designs target tolerance of +/−5% or better for inductance. Thus, this offset voltage may vary between 12.16 mV to 13.44 mV. The difference is very small and the worst-case value of 12.16 mV can be used for design purposes. This means that the voltage at the V_SENSE node will be 12.16 mV when the secondary current reaches zero. Thus, the turn off command given by the synchronous rectifier controller should correspond to a voltage level of +12.16 mV at the V_SENSE node.

In actual operation, it may be desirable to add an additional margin to this offset voltage to compensate for the propagation delay of the control and drive stage. For example, the threshold may be set lower than +12.16 mV in above example. Because converter 300 operates in discontinuous current mode, a slightly premature or slightly delayed turn off of synchronous rectifier Q2 may be tolerable. In either case (i.e., with or without this additional margin), the body diode conduction of synchronous rectifier Q2 may be significantly reduced as compared to various prior art solutions. It will be appreciated that because the circuit elements described above effectively form a voltage divider, in a discontinuous current mode topology with a triangular current down slope, such as a flyback or buck converter, the turn off "V_SENSE" threshold for the synchronous rectifier MOSFET Q2, can have the same ratio with output voltage VOUT as that of the ratio of parasitic inductance L_SENSE to secondary winding inductance L_sec. Thus, as illustrated in FIG. 6, the ratio of R3 to R2 can be equal to the ratio of L_sec to L_SENSE (i.e., L1+L2+L3).

Figure 5:
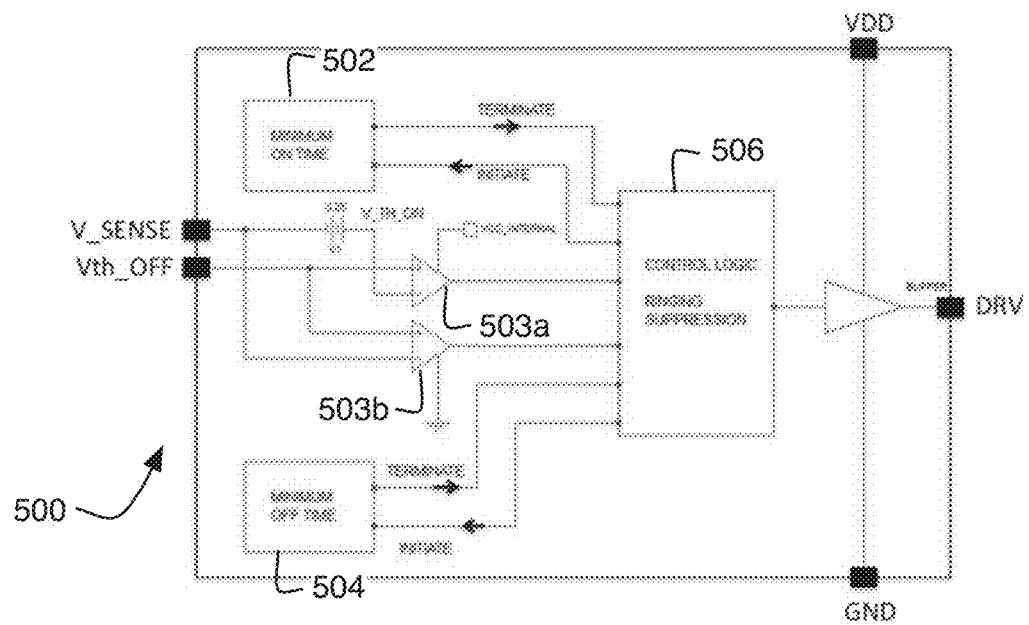
FIG. 5 illustrates a synchronous rectifier controller with off voltage threshold compensation.

FIG. 5 illustrates an exemplary synchronous rectifier control circuit 500 implementing the control technique described above. In some embodiments, synchronous rectifier control circuit 500 may be implemented in silicon as an integrated circuit. Synchronous rectifier switch Q2 may be turned on when the sensed voltage at V_SENSE level falls lower than −0.25V (which corresponds to reference voltage source V_TH_ON, having a value of 0.25V). This condition may be detected by comparator 503a. It will be appreciated that other on threshold voltage values could also be used. Using such a relatively low on threshold voltage can ensure that synchronous rectifier switch Q2 is turned on even if the converter includes an external Schottky diode across synchronous rectifier switch Q2 to reduce losses. Once the synchronous rectifier drive DRV goes high, under the direction of control logic 506, it may be kept high for a predetermined minimum on time implemented by timer circuit 502 to ensure there is no rapid turn on and turn off of the synchronous rectifier caused by ringing of the parasitic leakage inductance. In some embodiments, described below with respect to FIGS. 10-12, an adaptive minimum on time may be provided. A turn off threshold (Vth_OFF) may be set by using a voltage divider at the Vth_OFF pin from the output to ground. (An exemplary divider using resistors R3 and R2 is illustrated in FIG. 6, discussed below.) When the sensed voltage at V_SENSE reaches this off threshold signal level (Vth_OFF), as detected by comparator 503b, the synchronous rectifier drive (DRV) may be turned off under the direction of control logic 506. The drive signal (DRV) may then be held low for a predetermined minimum off time implemented by timer circuit 504 to prevent false triggering. In other embodiments, described below with respect to FIGS. 13-15B, other aspects beyond a predetermined minimum off time may be incorporated to prevent false triggering. Synchronous rectifier controller 500 may be powered by bias voltage VOUT appearing between the VOUT and ground (GND) pins.

Figure 6:
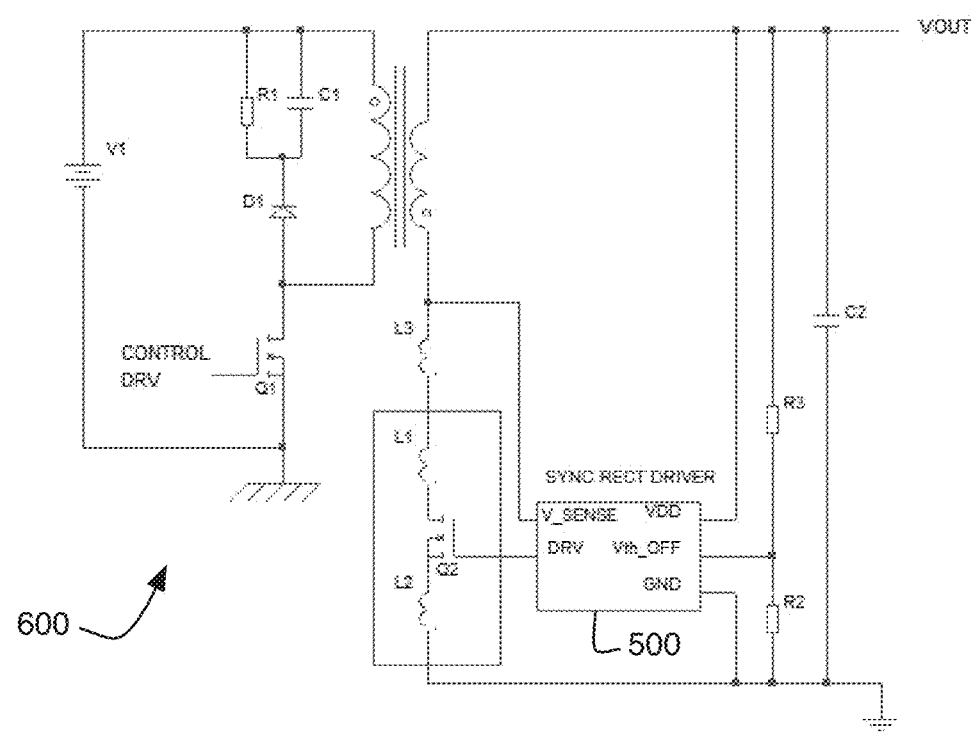
FIG. 6 illustrates a flyback converter incorporating the synchronous rectifier controller of FIG. 5.

A flyback converter 600 implementing the synchronous rectifier controller 500 is illustrated in FIG. 6. As illustrated, synchronous rectifier controller 500 can be powered directly from the output voltage if the output voltage VOUT is appropriate for the controller. Otherwise, a separate voltage supply (not shown) may be provided. Operation of the flyback portion of the circuit is as described above with respect to FIG. 2A. Main switch Q1 is alternately closed to store energy in the flyback transformer and opened to cause the stored energy to be transferred to the output. Resistor R1, capacitor C1, and diode D1 form a clamp to limit the input voltage on turn off of main switch Q1 and recover energy from the leakage inductance of the primary transformer. On the secondary side, output capacitor C2 serves to filter and stabilize the output voltage VOUT. Synchronous rectifier switch is operated by synchronous rectifier driver 500 as described above to provide output rectification with improved efficiency by compensating for the effects of parasitic inductances L1, L2, and L3. Resistors R3 and R2 form a voltage divider that divides VOUT to the desired off threshold voltage. As noted above, resistors R3 and R2 can have the same ratio as the ratio of the inductance of secondary winding L_sec to the sum of the parasitic resistances L_SENSE (i.e., L1+L2+L3).

Figure 7:
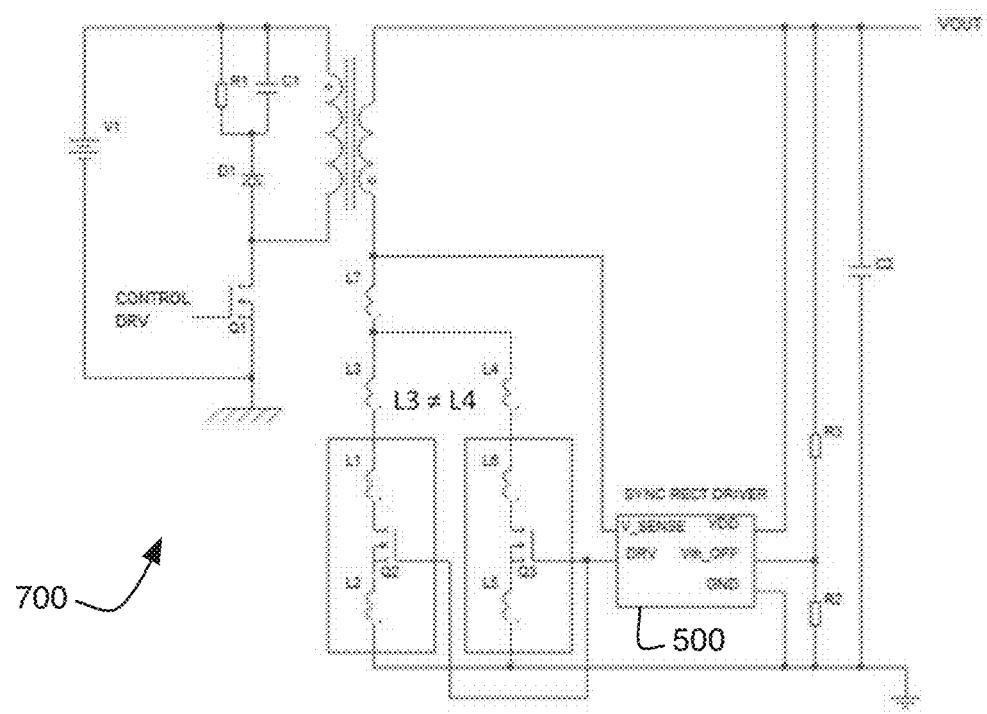
FIG. 7 illustrates a flyback converter having parallel synchronous rectifier devices and incorporating the synchronous rectifier controller of FIG. 5.

The circuits and techniques described above may also be applied to embodiments in which two or more synchronous rectifiers are operated in parallel. An exemplary flyback converter 700 of this type is illustrated in FIG. 7. Flyback converter 700 operates substantially similarly to the flyback converters discussed above with respect to FIGS. 2A and 6. The difference with respect to flyback converter 700 is the use of paralleled synchronous rectifier switches Q2 and Q3. In some embodiments, synchronous rectifier switches Q2 and Q3 may be the same type of device, meaning that the parasitic inductances L1 and L2 associated with synchronous rectifier Q2 would be substantially the same as the parasitic inductances L5 and L6, associated with synchronous rectifier Q3, respectively. However, even if the device parasitics are the same, the inductances L3 and L4 associated with the respective PCB traces for each device may be different, even though design engineers typically try to match these as closely as possible to achieve equal sharing between the two devices. (In the depicted embodiment, inductance L7 may correspond to a PCB trace associated inductance that is common to both synchronous rectifiers.)

Applying traditional synchronous rectifier control techniques to the arrangement of FIG. 7, the location of sensing node V_SENSE would be decided by trial and error during the design phase. Additionally, such location would most likely never be optimal for all the parallel devices. However, employing the control techniques and circuits described above, the turn off threshold is not zero or negative, but a positive voltage level. This allows for voltage sensing after a common junction of two devices where the currents through each synchronous rectifier device are summed. Thus, optimal control of multiple synchronous rectifier switches operated in parallel may be achieved.

As noted above, the parasitic inductances L1, L2 and L5, L6 of both synchronous rectifier MOSFETs Q2 and Q3 are matched in the case of identical devices. However, the values of L3 and L4, which are the inductances of the respective PCB traces may (and likely will) be different. If the sense point is chosen to be at a node upstream of the common junction (i.e. above the layout inductance L7), then all of the parasitic inductances associated with each device can be lumped into one equivalent inductance (not shown). The techniques and circuits described above may then be employed to select an appropriate turn off threshold to optimize turn off timing for the synchronous rectifier MOSFETS.

Figure 8:
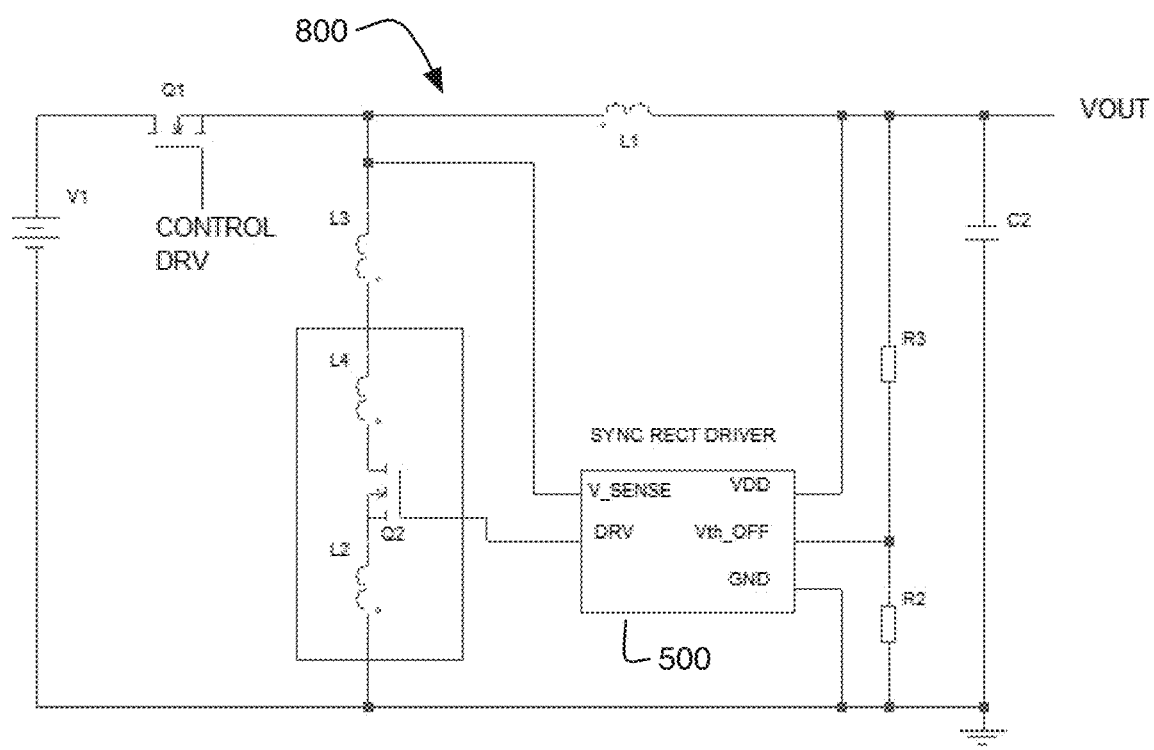
FIG. 8 illustrates a buck converter incorporating the synchronous rectifier controller of FIG. 5.

The foregoing embodiments have all been DCM flyback converters; however, the synchronous rectifier control circuits and techniques may also be used in conjunction with other DCM converter topologies. For example, FIG. 8 illustrates a DCM buck converter 800 employing a synchronous rectifier controlled by synchronous rectifier driver 500, described above. Operating principles of synchronous buck converters is known to those skilled in the art, and thus are not repeated here in detail. In summary, control switch Q1 may be operated with a variable duty cycle to convert input voltage V1 to a regulated output voltage VOUT. When control switch Q1 is turned on, current flows from input voltage V1, through buck inductor L1, to the output terminal. When control switch Q1 is turned off, the current through L1 cannot change instantaneously, and current flows through buck inductor L1, the load, and through the intrinsic body diode of synchronous rectifier switch Q2. Capacitor C2 serves as the output and filter capacitor for the circuit. Inductors L2 and L4 represent the parasitic inductances associated with synchronous rectifier switch Q2 and in general have all the same properties discussed above. Inductor L3 represents the parasitic inductances of the PCB traces and in general has all the same properties discussed above with respect to the flyback converter embodiments. Resistors R2 and R3 form a voltage divider that sets the turn off threshold voltage as described above and may have a ratio that corresponds to the ratio of the parasitic inductances (L2+L4+L3) to the buck inductor inductance L1. As above in FIG. 6, synchronous rectifier controller 500 can be powered from the output voltage itself if the VOUT level is appropriate for the controller. Otherwise, a separate voltage supply may be used as necessary. The separate voltage supply may be beneficial for applications in which the output voltage varies widely, such as a battery charger.

In all of the above examples, the turn off threshold is set through a voltage divider connected to the output voltage. As a result, the turn off threshold automatically adjusts to match the slope of falling current when output voltage is changed (as in USB-C systems).

Figure 9A:
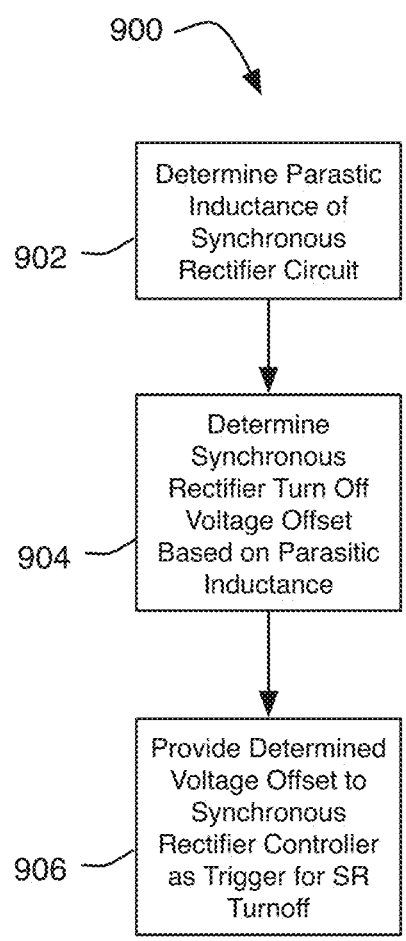
FIG. 9A illustrates a method that may be performed by a circuit designer to implement a synchronous rectifier controller as described herein.
Figure 9B:
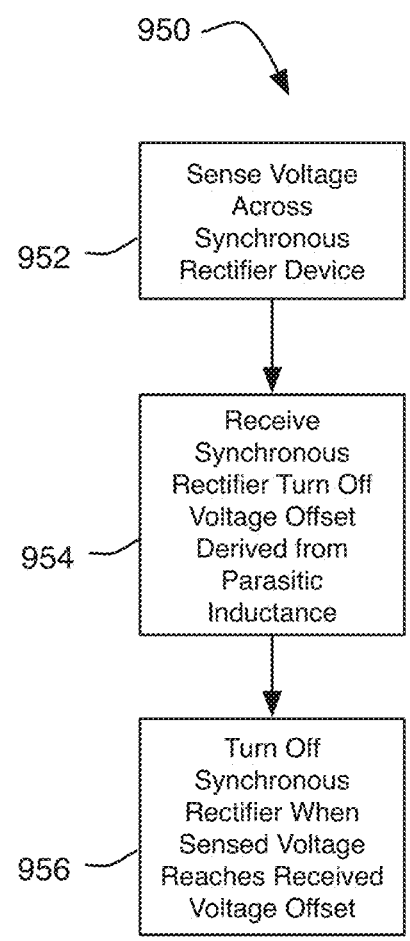
FIG. 9B illustrates a method that may be performed by a synchronous rectifier controller as described herein.

FIGS. 9A and 9B illustrate methods of synchronous rectifier operation employing the principles above. FIG. 9A illustrates a method 900 of configuring the circuit. The method can begin in process 902 with determining the parasitic inductance of the synchronous rectifier circuit. This can include identifying and determining values for the parasitic inductances associated with the synchronous rectifier device and any associated wiring or PCB traces. Then, in process 904, the determined inductance values can be sued to determine the voltage offset of the sensed voltage corresponding to the zero crossing of the synchronous rectifier current. Then, in block 906, the determined voltage offset may be provided to the synchronous rectifier controller as a trigger for synchronous rectifier turnoff.

FIG. 9B illustrates a method 950 of operating the circuit. In process 952, the controller may sense the voltage across the synchronous rectifier device (including the parasitic inductance elements). In process 954, the controller may receive the synchronous rectifier turn off voltage offset derived in process 904 (or by other suitable technique). Then, in process 956, the controller may turn off the synchronous rectifier when the sensed voltage reaches the received voltage offset. As described above, both these methods may be used with discontinuous current mode converters, including flyback converters and buck converters. The methods may also be used with single or multiple paralleled synchronous rectifier devices. In some embodiments, the methods may be implemented by analog control circuitry, digital control circuitry, or hybrid analog/digital circuitry. It will be appreciated that, in many embodiments, the improved response time and reduced complexity of an analog comparator based implementation may provide a desirable tradeoff between control cost, complexity, and efficiency.

The DCM flyback converter topology described above can have several operating modes, such as fixed frequency operation, variable frequency boundary mode operation, or valley skipping operation. In some embodiments, the synchronous rectifier driver integrated circuit (IC) may incorporate a minimum ON time feature for the synchronous rectifier control. Because of circuit parasitic elements, current may oscillate back and forth between primary and secondary for a short time period following main switch switching events. The minimum ON time may prevent the synchronous rectifier switch from toggling during the current oscillations associated with commutation of the converter current from primary side to secondary side, thereby ensuring a stable drive signal to the synchronous rectifier switch by forcing the drive to stay high for this time duration. More specifically, a circuit designer may ensure that the converter never operates such that synchronous rectifier conduction time is less than a minimum on time determined the synchronous rectifier driver. In some embodiments, the converter may enter a burst mode of operation before the synchronous rectifier conduction time equals the minimum on time of the driver.

Further, in a light load condition, the control and gate drive power consumption of the synchronous rectifier (SR) switch may become higher the power loss in the synchronous rectifier itself. Thus, in some embodiments, it may be desirable to disable the synchronous rectifier device at light load. Light load operation mode may be initiated responsive to a measurement output power or output current of the power converter. However, these measurements require additional current sensors and analog circuit elements, which can increase power loss and cost to the design. Alternately, the average duty cycle of synchronous rectifier or the flyback transformer voltage may be used to determine the light load operation. However, these methods may not be adequate in some operating modes, such as variable frequency boundary mode operation.

With the adoption of the USB-C standard, one converter may support multiple output voltages and power levels. This adds another layer of complexity to minimum ON time and light load detection parameters. For example, rectifier conduction time may be significantly different for a converter operating with 20V output versus the same converter operating with a 5V output. More specifically, at a given operating frequency, the free-wheeling time in 5V mode may be much larger than in 20V mode because of a lower reset voltage, if the converter operates at same frequency. Some embodiments may reduce the operating frequency in 5V mode as compared to 20V, which may further increase rectifier conduction time in 5V mode. Depending on the power output, operating peak current, and the leakage inductance of the transformer, the parasitic current ringing during commutation from primary to secondary in 5V mode can be significantly larger than that in 20V mode. Thus, different minimum ON times may be desirable for different operating modes, voltages, and/or output power levels. Additionally, different light load detection techniques may also be warranted.

Thus, in some embodiments, the synchronous rectifier controller may adaptively change the minimum ON time for the synchronous rectifier responsive to output voltage changes. The synchronous rectifier controller may also compare the actual rectifier conduction time with a preset minimum ON time corresponding to the selected output voltage to detect a light load condition. Once a light load condition is detected, various techniques may be employed to adjust synchronous rectifier operation to improve operating efficiency. For example the synchronous rectifier drive can be disabled, allowing the rectification function to be performed by the passive body diode of the synchronous rectifier switch. Additionally or alternatively, an amplitude of the synchronous rectifier drive signal may be reduced when in light load mode.

Implementing an adaptive minimum on time in a synchronous rectifier controller may include four aspects: (1) Setting a minimum ON time for the synchronous rectifier at maximum output voltage (e.g., 20V). (2) Increasing the minimum ON time inversely proportional to the output voltage. (Thus, lower output voltages will have proportionally longer minimum on times.) (3) Setting a light load detection threshold as a minimum rectifier conduction time relative to the minimum ON time for a given output voltage/operating mode. (Thus, for any output voltage, a light load condition will be detected when a ratio of rectifier conduction time to minimum rectifier conduction time falls below a threshold.) (4) Incorporating hysteresis and time delays into the synchronous rectifier control algorithm to set the boundaries of light load detection entry and exit levels. (This is described in greater detail below.)

Figure 10:
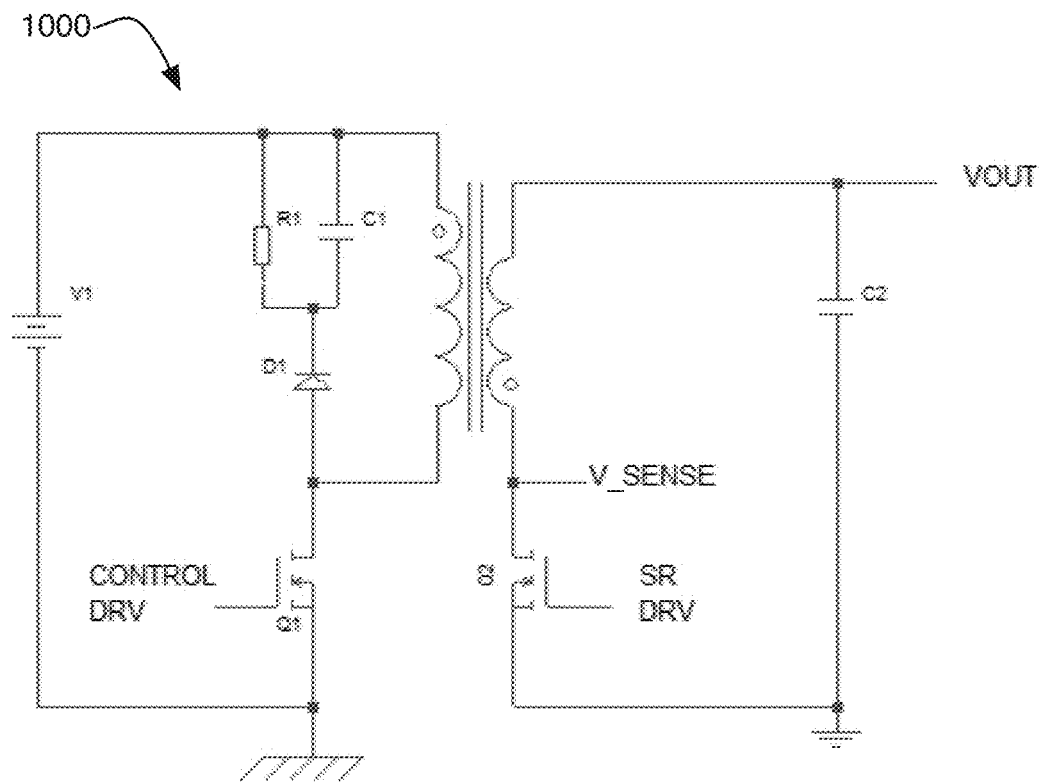
FIG. 10 illustrates an exemplary flyback converter with a synchronous rectifier incorporating adaptive minimum on time and adaptive light load detection.

FIG. 10 schematically illustrates an exemplary flyback converter that may incorporate adaptive minimum on time and light load detection techniques. It will be appreciated that this flyback converter corresponds to the flyback converters described above with respect to FIGS. 1A, 2A, 3, 6, and 7 and may be operated similarly with the addition of adaptive minimum on time and adaptive light load detection techniques. For example, the voltage V_SENSE across the synchronous rectifier MOSFET Q2 may be monitored by the synchronous rectifier control IC (not shown in FIG. 10, but previously identified by reference numeral 500) and used to control the synchronous rectifier switch as described.

Figure 11:
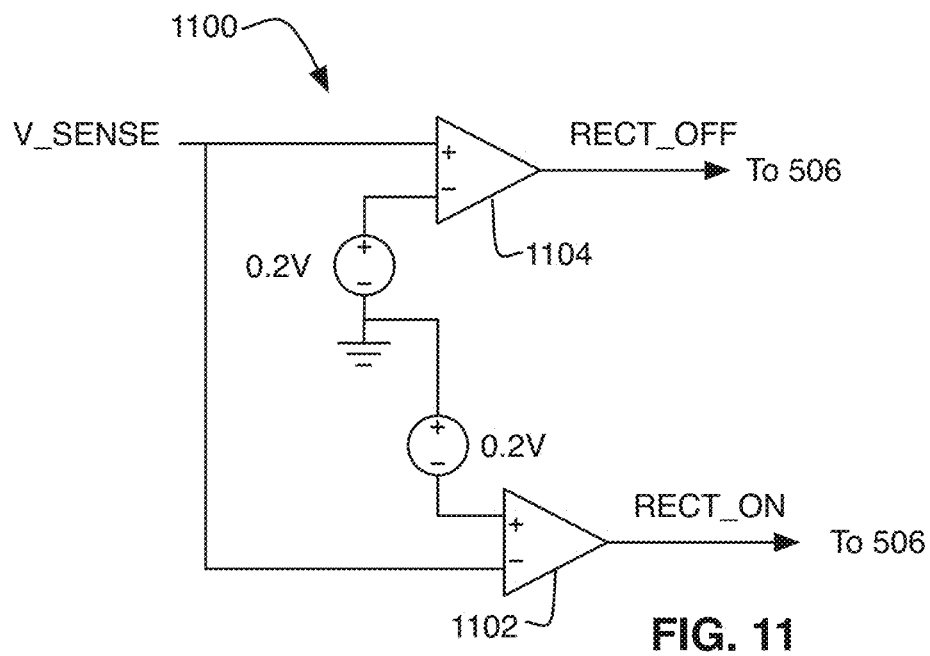
FIG. 11 illustrates a supervisory circuit that may be used with a synchronous rectifier incorporating adaptive minimum on time and adaptive light load detection.

FIG. 11 illustrates a supervisory circuit that may be incorporated into the synchronous rectifier control IC depicted in FIG. 5. This supervisory circuit 1100 may be configured to monitor the duration of secondary current with some conservative margin. Because this signal is not used for synchronous rectifier control, it need not be exceptionally precise, but should be relatively stable. A comparator 1102 monitors the voltage at the V_SENSE node (FIG. 10) and uses a voltage threshold of −0.2V to detect rectification ON. A comparator 1104 monitors the V_SENSE node and uses a voltage threshold of +0.2V to detect rectification OFF. The RECT_OFF and RECT_ON signals may be provided to the control logic 506 of synchronous rectifier control integrated circuit 500 illustrated in FIG. 5. It will be appreciated that actual rectification terminates when the V_SENSE signal is crossing zero, but using a conservative threshold of +0.2V ensures stable operation while meeting the accuracy expected for this function.

It will be further appreciated that the +/−0.2V thresholds described above are exemplary values and that other thresholds could be used. For example, the rectification ON threshold having negative polarity can be same as that used for the synchronous rectifier turn on threshold. Alternatively, it can be as low as −0.4V because the synchronous rectifier body diode does conduct on the leading edge of secondary current. The rectification OFF threshold can be a positive value slightly above the zero level, but beyond the expected signal distortion due to circuit parasitic elements.

Turning back to FIG. 5, minimum on time circuit 502 can be a timer that may be implemented using digital, analog, or hybrid circuits. For embodiments in which the synchronous rectifier driver 500 is powered directly from the converter output voltage, VOUT is known to the control circuit. Thus, a timer may be set at a required value corresponding to the VOUT max level. When the output voltage is reduced (i.e., the converter is switched to a different output voltage mode) based on system request, the minimum ON time may be proportionately increased by injecting error in the timing circuit. For example, the minimum on time at 5V output will be 4 times higher than that set for 20V output in a variable output DCM flyback converter.

Minimum on time timer 502 may be implemented using a variety of different circuits. For example a current source proportional to output voltage may be generated and used to charge a fixed capacitor. The capacitor charging up to a predetermined reference voltage may be used to complete the timing. With a 4× reduction in of current source amplitude for 5V as compared to 20V, the capacitor will need a corresponding proportionately longer time to charge up to the required reference value. This will give a 4× longer minimum ON time. Other timer designs are also possible and contemplated.

Figure 12:
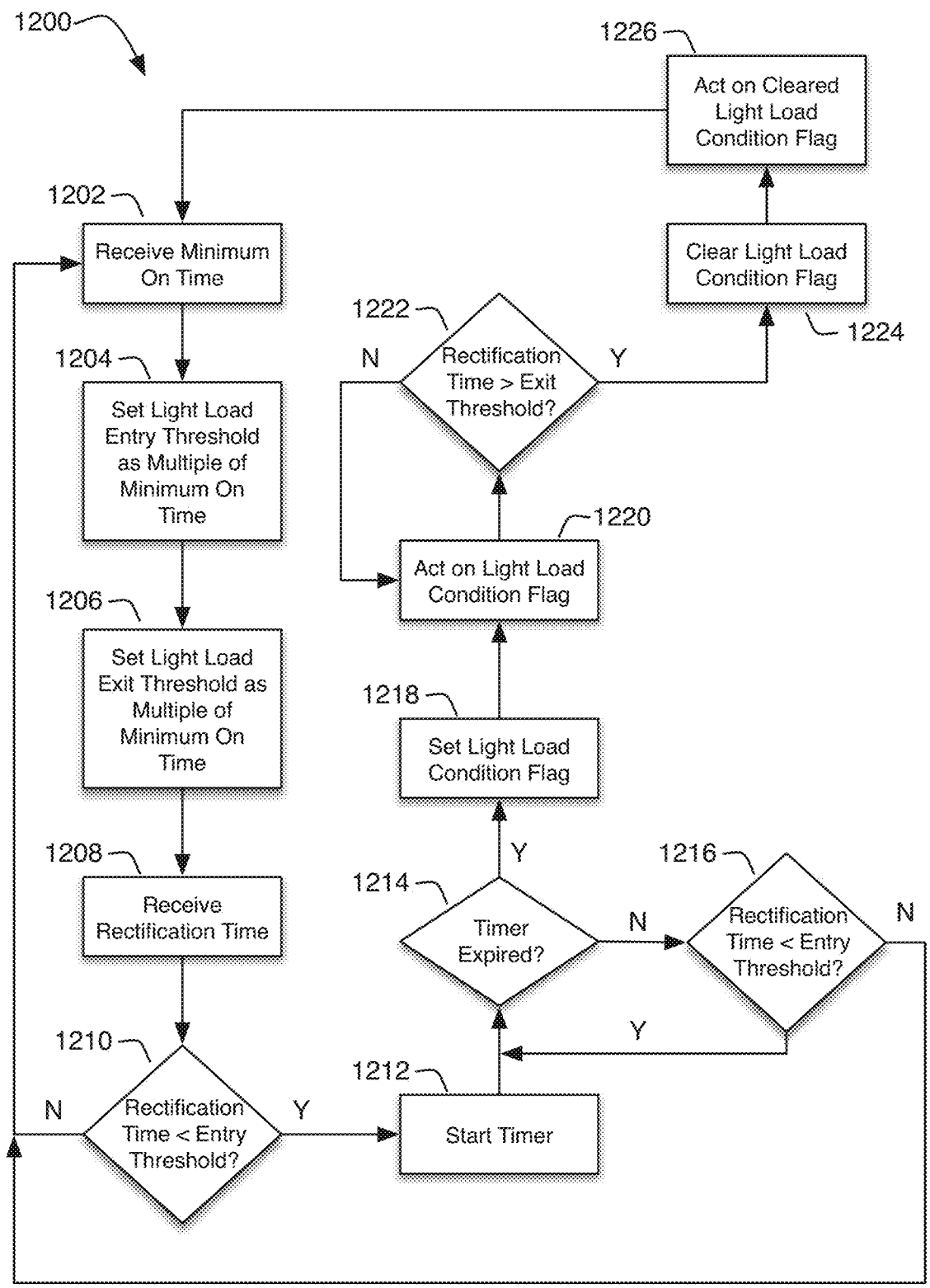
FIG. 12 illustrates a flowchart depicting adaptive light load sensing based on synchronous rectifier minimum on time.

With reference to FIGS. 5 and 11, and with further reference to the flow chart of FIG. 12, the timing pulses delivered by rectification time monitor circuit 1100 may be further compared with a minimum ON time pulse in control logic 506 (blocks 1202, 1204, 1208, and 1210). A preset threshold may be provided to set the minimum rectification time as a multiple of the minimum ON time (block 1204). For example, one embodiment may use a rectification time equal to twice the minimum on time as a threshold to detect light load condition. In other words, rectification times lower than 2× the minimum on time may be used to trigger light load operation. More specifically, once this minimum rectification time threshold is reached (block 1210), the converter may be allowed to operate below this threshold for a fixed time duration to ensure it is not a transient condition (blocks 1212, 1214, and 1216). Once the timer duration lapses (block 1214), and if rectifier conduction time is still found to be lower than the threshold (block 1216), light load condition may be flagged (block 1218) for further action by the housekeeping circuit. An internal housekeeping circuit may use the light load condition flag in various ways to achieve the design objectives (block 1220). For example, this signal can be used as a trigger to disable synchronous rectifier operation or reduce the amplitude of drive voltage.

Another higher threshold of rectifier conduction time (block 1206) may be used to decide when the light load condition may be considered to have been exited. This higher rectifier conduction time threshold may also be set as a multiple of the minimum ON time setting. For example, the threshold for exiting the light load condition can be 2.5 times the minimum ON time. Providing adequate hysteresis between entry and exit of the light load condition ensures stable and toggle free operation of the synchronous rectifier. When rectifier conduction time exceeds the light load detection exit threshold (block 1222), such signal is flagged (block 1224). As above, the housekeeping circuit (e.g., a portion of control logic 506) may be configured to respond appropriately to this signal (block 1226). For example, in one implementation, a light load exit signal may instantly enable synchronous rectifier operation to prevent higher power delivery through the body diode of synchronous rectifier MOSFET (and the associated high conduction losses).

Thus, according to the foregoing, an adaptive minimum on time may be used in conjunction with multiple output voltages to provide synchronous rectifier control with enhanced efficiency and stability. Although the foregoing adaptive minimum on time embodiments have been described with respect to a flyback converter, it will be appreciated that these concepts may also be used in conjunction with other converter topologies, including, for example, the buck converters described above. In some embodiments these converters may be discontinuous current mode converters.

Figure 13:
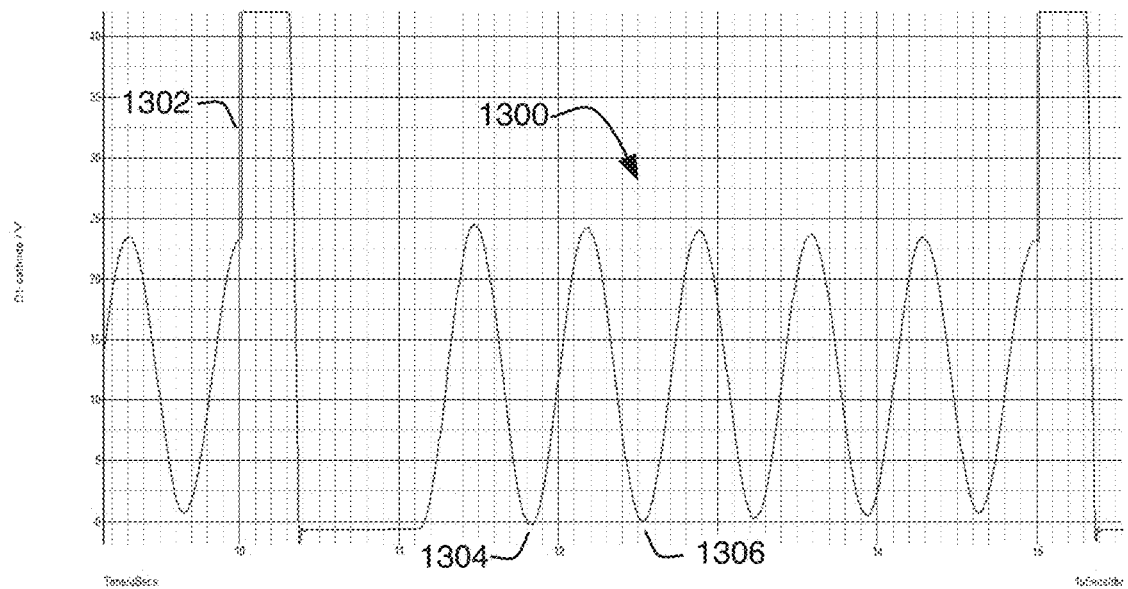
FIG. 13 illustrates a voltage waveform associated with a flyback converter.

FIG. 10, discussed above, shows a conventional DCM fly-back converter. FIG. 13 illustrates the voltage signal 1302 appearing at the drain node of synchronous rectifier during steady state operation. This signal may be used by the controller IC (e.g., controller IC 500) to drive the synchronous rectifier. In burst mode, which as described above may be used to improve efficiency when operating at lower loads, ringing 1300 may occur. A boundary mode or critical conduction mode flyback converter may not exhibit such ringing in normal operation. Inspection of FIG. 13 shows that the first one or two ringing cycles 1304, 1306 can be deep enough to go below zero volts, which can cause an undesirable second turn on operation of the synchronous rectifier.

Previously, some commercially available synchronous rectifier controllers have prevented such secondary turn on events by disabling the controller for a fixed pre-determined time, also known as minimum off time. (See above discussion with respect to minimum off time controller 504.) If the ringing does not go below a set positive voltage threshold within this time period, ringing may be considered sufficiently diminished, and synchronous rectifier drive control may be reenabled. While this techniques suitably prevents unwanted secondary turn on events, it requires selecting an appropriate minimum off time for each new design. As a result, a commercially packaged synchronous rectifier driver IC requires a dedicated pin for time selection circuitry (typically a resistor and/or capacitor) or a one-time programmable (OTP) selection of minimum off time. Either options leads to increased costs. Thus, it would be advantageous to implement a synchronous rectifier controller that can prevent such secondary turn on through a single parameter setting that can support majority of the applications.

"Differentiator Based Sensing" may be used to detect completely damped ringing and thus reenable turn-on operation of the synchronous rectifier MOSFET. Further, it is possible to enable the synchronous rectifier drive sensor only after next primary switch cycle begins, which may completely prevent secondary turn on during the off time of the primary switch Q1.

Figure 14:
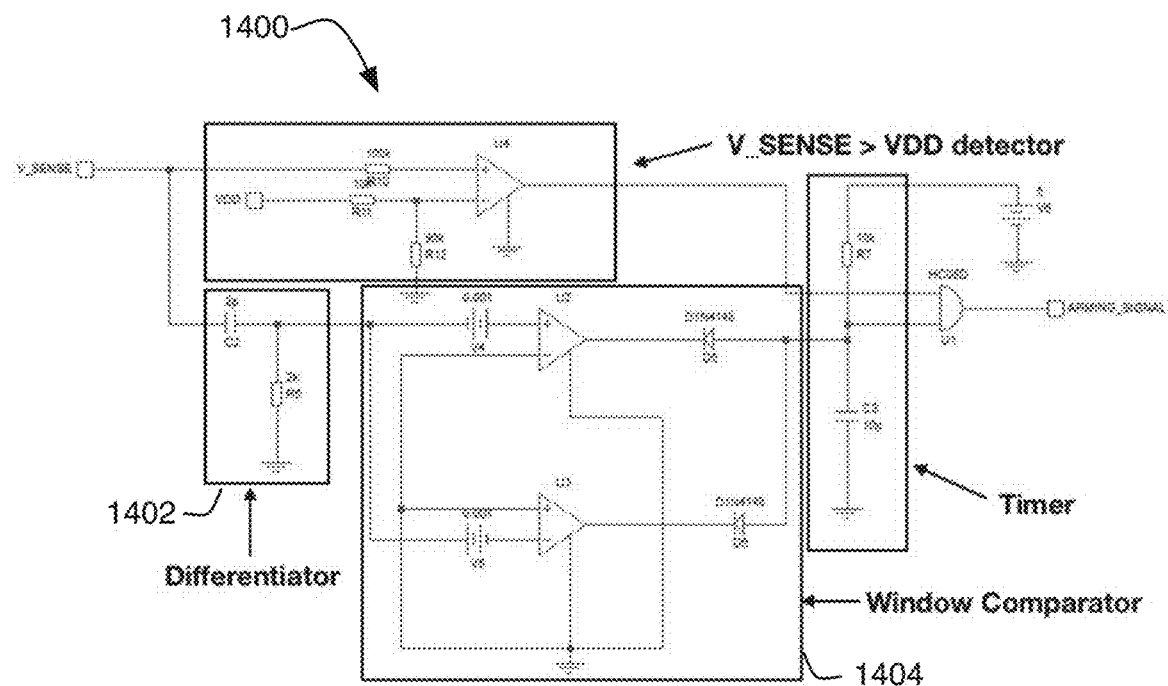
FIG. 14 schematically depicts a differentiator based synchronous rectifier enable circuit.

FIG. 14 illustrates an embodiment of a differentiator based sensing arrangement 1400. A high sensitivity differentiator 1402, comprised of capacitor C2 and resistor R6 may be used to sense oscillations across the synchronous rectifier MOSFET at the V_SENSE node. (See, e.g., FIG. 10 above for location of V_SENSE node.) Whenever an AC signal of high voltage slew rate (i.e., high dV/dT), such as the ringing 1300 discussed above, is injected through the differentiator, the output of window comparator 1404 goes low, except for a short duration when the signal is below the reference. A zero volt reference may also be used for the window comparator. Only when the oscillations are completely damped, i.e., when dV/dT becomes much lower than the sensitivity of the differentiator, can the output of window comparator 1404 go high. Thus, if the off time during the burst interval is sufficiently long, then the oscillations may damp completely, allowing window comparator 1404 to go high. Alternatively, if the primary switch Q1 is turned on by the controller, the voltage across the synchronous rectifier switch will go high (due to the primary current) and will stay flat during the transformer energization portion of the switching cycle. This also allows the output of window comparator 1404 to go high.

The first input of the AND gate U1 becomes high only when the output of window comparator 1404 output stays high for a time period determined by the timer comprised of resistor R7 and capacitor C3. Upon turn on of the primary switch Q1, some parasitic high frequency ringing may be observed at the V_SENSE node due to hard switching. It may be preferable to ensure that when the converter operates at minimum on time while entering the burst mode, the voltage at V_SENSE node stays flat for the duration of the R7-C3 timer after these parasitic oscillations are damped. Some discontinuous conduction mode (DCM) flyback converters, including those operating at higher frequencies, may have a 300 ns or greater on time of main switch Q1 before it enters burst mode. Thus, a timer duration of 100 ns can meet requirement of wide range of applications. For other embodiments, different time durations may be selected as appropriate.

Another comparator U4 senses the voltage amplitude across the synchronous rectifier switch. If the synchronous rectifier driver is biased directly from the flyback converter output (VOUT), then this circuit ensures that synchronous rectifier drive is enabled only when primary switch Q1 turns on in the next switching cycle. If the synchronous rectifier driver is powered by a voltage that is lower than the output of the converter (VOUT), then the synchronous rectifier drive will be enabled either upon complete damping of ringing during the dead time or upon turn on of the primary side switch. The output of comparator U4 may be fed into the second input of the AND gate U1. In some embodiments, comparator U4 may be eliminated and both inputs of AND gate U1 shorted, which will allow enabling of the turn-on comparator to ARM as soon as oscillations are damped, without regard to the status of the primary power control switch. Alternatively, if the synchronous rectifier driver is powered by a bias supply voltage that is higher than the output of the converter VOUT, then the design may be configured to ensure that the comparator U4 can respond when the primary switch Q1 turns on. In the illustrated embodiment, comparator U4 compares V_SENSE to a threshold of 1.1×VDD, although other values may be employed as appropriate to a given embodiment.

Figure 15A:
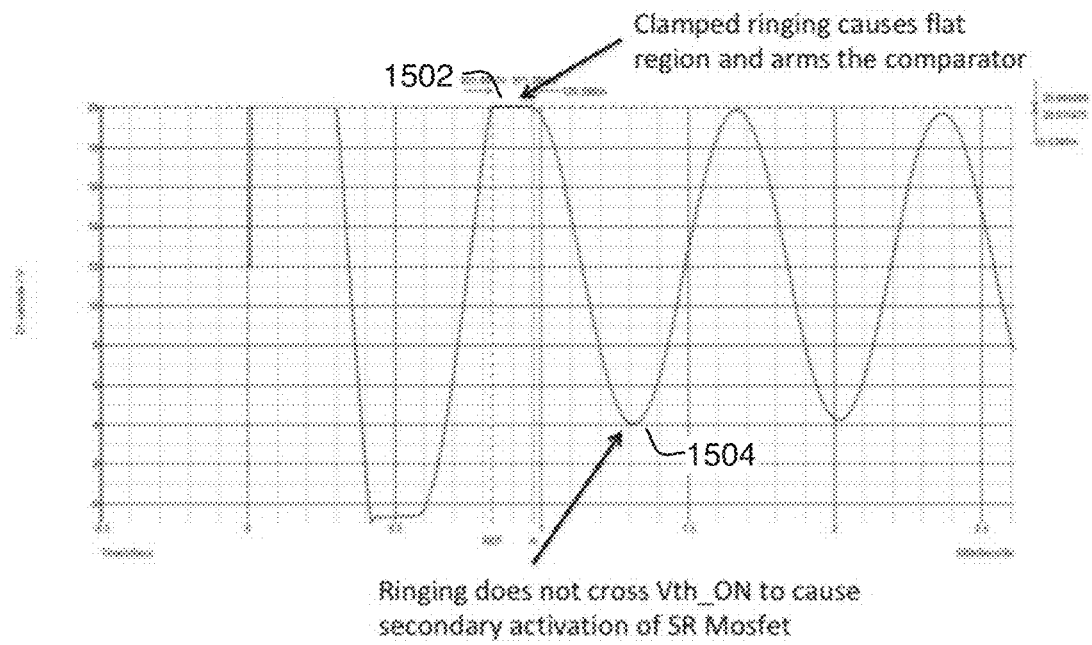
FIGS. 15A-B illustrate various waveforms associated with a flyback converter and the differentiator based synchronous rectifier enable circuit of FIG. 14.
Figure 15B:
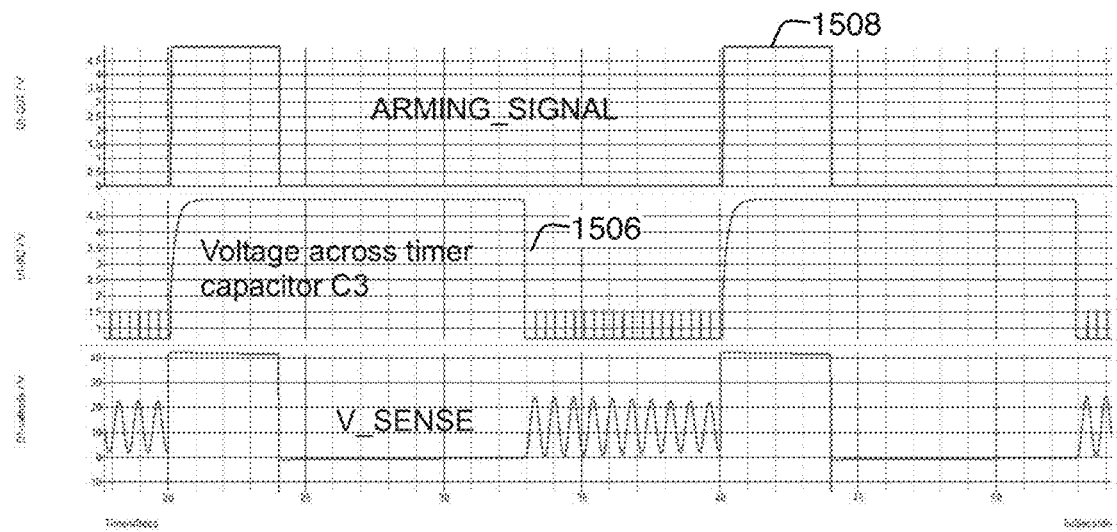

There are some conditions under which a false signal could ARM the turn-on comparator of the driver but that are not likely to cause secondary turn on of the synchronous rectifier MOSFET. One such condition is illustrated in FIGS. 15A and 15B, which show operation of a DCM flyback converter designed with a reflected output voltage of 120V at an input voltage of 80V. In the illustrated example, where the reflected voltage is significantly larger than the input voltage, the resonant ring can clamp the body diode of the primary switch Q1. This can cause a flat voltage region 1502 at the V_SENSE node that can have duration longer than 100 ns. Window comparator 1404 can detect this and arm the turn-on comparator. However, in such a case, the secondary ringing should not be deep enough (1504) to reach the zero volt threshold at V_SENSE (which would also be required to trigger turn on of the synchronous rectifier switch). In FIG. 15B, it can be seen that the voltage 1506 across timing capacitor C3 does not reach the input high threshold of the AND gate U1 during the parasitic ringing. However, when the primary switch turns on, output of U1 goes high and provide the enable or ARMing signal 1508 to the turn-on comparator of the driver.

Thus, differentiator based off time control circuitry that selectively enables the synchronous rectifier drive only after the next primary switching cycle begins can be used to prevent secondary turn on of the synchronous rectifier switch. Differentiator based sensing may be used to provide synchronous rectifier control with enhanced efficiency and stability by eliminating unnecessary triggering of the synchronous rectifier. Although the foregoing embodiments have been described with respect to a flyback converter, it will be appreciated that these concepts may also be used in conjunction with other converter topologies, including, for example, the buck converters described above. In some embodiments these converters may be discontinuous current mode converters.

Those skilled in the art will appreciate that numerous advantages may be achieved by the control techniques and circuits described herein. For example, higher efficiency and better exploitation of synchronous MOSFETs may be achieved by substantially reducing intrinsic body diode conduction losses at the lagging end of current in DCM topologies having a fixed down slope of current. Such arrangements may also provide superior performance at high operating frequencies, as well as higher regulation accuracy in designs that use primary side regulation. This higher accuracy may be achieved by eliminating or at least substantially reducing sampling error caused by intrinsic body diode conduction near the zero current detection instance. Additionally, the circuits and techniques described herein can enable parallel synchronous rectifier operation without compromising performance, as well as automatic feedback and adjustment of the turn off threshold for variable output topologies such as AC adapters, which use USB-C protocol.

Described above are various features and embodiments relating to synchronous rectifier control in discontinuous current mode switching converters. Such regulators may be used in a variety of applications but may be particularly advantageous when used in conjunction with portable electronic devices such as mobile telephones, smart phones, tablet computers, laptop computers, media players, and the like, as well as the peripherals associated therewith. Such associated peripherals can include input devices (such as keyboards, mice, touchpads, tablets, and the like), output devices (such as headphones or speakers), storage devices, or any other peripheral.

Additionally, although numerous specific features and various embodiments have been described, it is to be understood that, unless otherwise noted as being mutually exclusive, the various features and embodiments may be combined in any of the various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A synchronous rectifier controller comprising:
   a voltage sensing terminal configured to receive a voltage across a synchronous rectifier device and a plurality of parasitic inductances associated with the synchronous rectifier device;
   an off threshold terminal configured to receive a turn off voltage offset from a voltage divider comprising first and second impedance elements coupled across the synchronous rectifier device, wherein a ratio of first and second impedances of the first and second impedance elements equals a ratio of an inductance of an inductor of a power converter to a sum of the plurality of parasitic inductances;
   a drive terminal configured to provide a drive signal to the synchronous rectifier device; and
   control logic configured to:
      compare the sensed voltage to a turn on threshold and to turn on the synchronous rectifier device when the sensed voltage exceeds the turn on threshold; and
      compare the sensed voltage to the turn off voltage offset and turn off the synchronous rectifier device when the sensed voltage reaches the turn off voltage offset.

2. The synchronous rectifier controller of claim 1, wherein the control logic comprises a minimum off time timer circuit.

3. The synchronous rectifier controller of claim 2, further comprising a differentiator based sensing circuit configured to selectively enable a synchronous rectifier driver responsive to ringing of the sensed voltage.

4. The synchronous rectifier controller of claim 3, wherein the differentiator based sensing circuit comprises:
   a differentiator configured to receive the sensed voltage and provide an output responsive to a rate of change of the sensed voltage;
   a window comparator configured to receive the output of the differentiator, compare the output to one or more threshold voltage, and provide an output; and
   a timer circuit configured to receive the output of the window comparator and, after a predetermined delay, allow a synchronous rectifier drive signal to be enabled.

5. The synchronous rectifier controller of claim 1, further comprising a circuit configured to determine whether the sensed voltage is greater than a supply voltage of the synchronous rectifier device and selectively allow a synchronous rectifier drive signal to be enabled responsive to the determination whether the sensed voltage is greater than a supply voltage of the synchronous rectifier device.

6. A discontinuous current mode power converter comprising:

an input configured to receive an input voltage;

an output configured to deliver a regulated output voltage to a load;

a main switching device coupled to an inductive element, wherein the main switching device is operated to maintain the regulated output voltage at the output; and a synchronous rectifier device coupled to the output and configured to be switched on when a voltage across the synchronous rectifier device and a plurality of parasitic inductances associated therewith exceeds a first threshold and configured to be switched off when the voltage across the synchronous rectifier device and the plurality of parasitic inductances associated therewith reaches a second threshold determined as a function of the plurality of parasitic inductances associated with the synchronous rectifier device, wherein the second threshold is produced by a voltage divider coupled across the output, the voltage divider comprising first and second impedance elements, wherein a ratio of first and second impedances of the first and second impedance elements equals a ratio of an inductance of the inductive element to a sum of the plurality of parasitic inductances.

7. The discontinuous current mode power converter of claim 6, wherein the power converter is a buck converter, and the inductive element is a buck inductor.

8. The discontinuous current mode power converter of claim 6, wherein the power converter is a flyback converter, and the inductive element comprises a flyback transformer.

9. The discontinuous current mode power converter of claim 6, wherein the plurality of parasitic inductances associated with the synchronous rectifier device comprise parasitic inductances associated with a package of the synchronous rectifier device.

10. The discontinuous current mode power converter of claim 6, wherein the parasitic inductances associated with the synchronous rectifier device comprise parasitic inductances associated with a printed circuit board trace coupling the inductive element to the synchronous rectifier device.

11. The discontinuous current mode power converter of claim 6, wherein the synchronous rectifier device comprises two or more synchronous rectifier devices coupled in parallel.

12. The discontinuous current mode power converter of claim 6, wherein the voltage divider comprises first and second resistors having a resistance ratio the same as a ratio of the parasitic inductances to the inductance of the inductive element.

13. The synchronous rectifier controller of claim 1, wherein the control logic configured to compare the sensed voltage to a turn on threshold and to turn on the synchronous rectifier device when the sensed voltage exceeds the turn on threshold comprises a minimum on time timer circuit.

14. The synchronous rectifier controller of claim 13, wherein the minimum on time timer circuit is configured to provide different minimum on times for different output voltages.

15. The synchronous rectifier controller of claim 14 wherein the minimum on time timer circuit provides a predetermined minimum on time at a maximum output voltage and a minimum on time that is increased by a factor inversely proportional to the output voltage for output voltages less than the maximum.

16. The synchronous rectifier controller of claim 1 wherein the plurality of parasitic inductances associated with the synchronous rectifier device include packaging parasitic inductances.

17. The synchronous rectifier controller of claim 1 wherein the plurality of parasitic inductances associated with the synchronous rectifier device include printed circuit board layout parasitic inductances.

18. The discontinuous current mode power converter of claim 6 wherein the plurality of parasitic inductances associated with the synchronous rectifier device include packaging parasitic inductances.

19. The discontinuous current mode power converter of claim 6 wherein the plurality of parasitic inductances associated with the synchronous rectifier device include printed circuit board layout parasitic inductances.

20. The synchronous rectifier controller of claim 14, further comprising at least one comparator configured to compare the sensed voltage to at least one threshold to determine whether the synchronous rectifier device is turned on or off.

21. The synchronous rectifier controller of claim 20, wherein the control logic is further configured to detect a light load condition by comparing a rectifier on time to a minimum rectifier on time.

22. The synchronous rectifier controller of claim 21, wherein the minimum rectifier on time is a multiple of the minimum on time.

23. The synchronous rectifier controller of claim 21, wherein the control logic is further configured to exit a light load operating mode responsive to a rectifier on time that is greater than a multiple of the minimum on time.

* * * * *